UNITED STATES PATENT OFFICE.

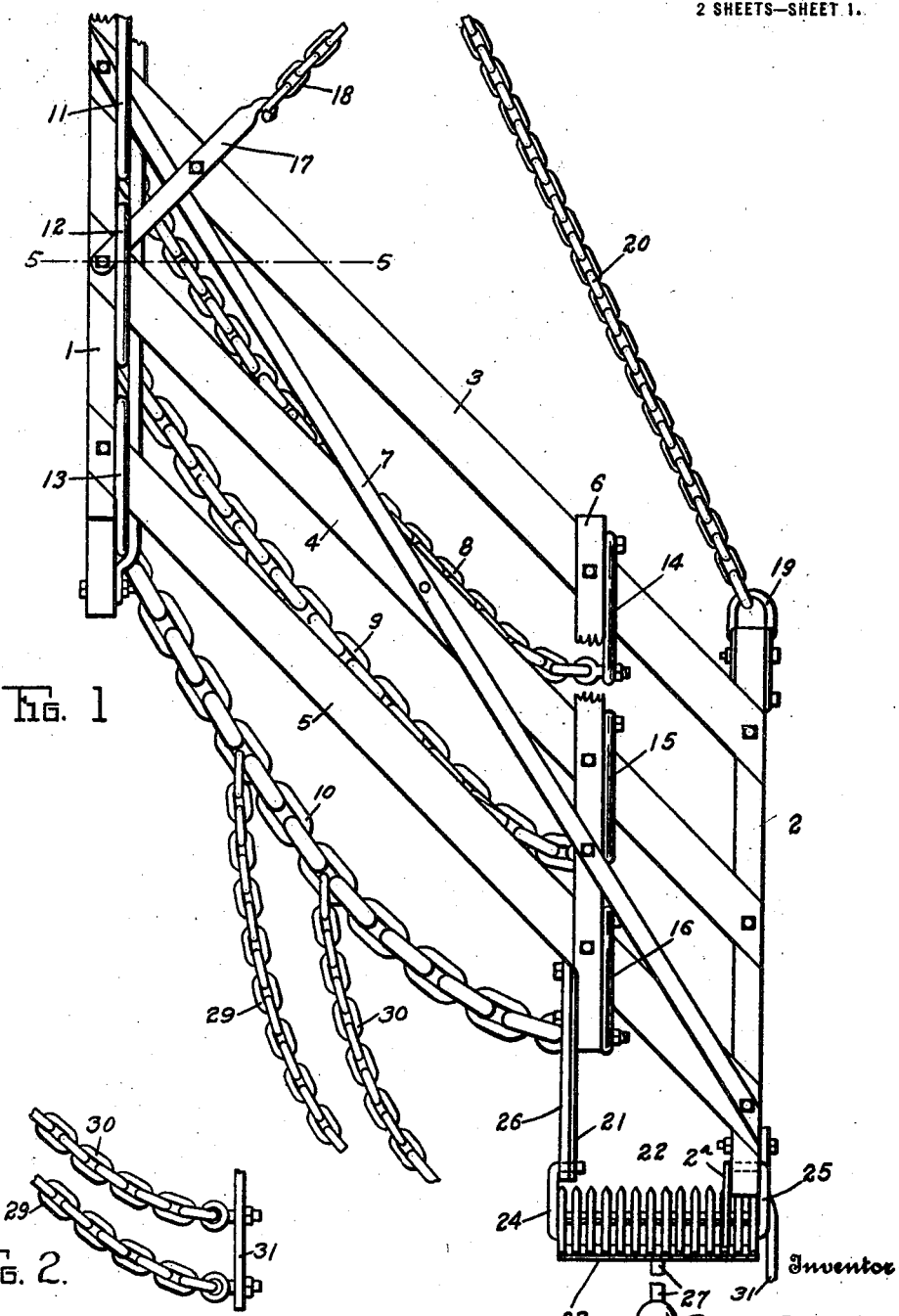

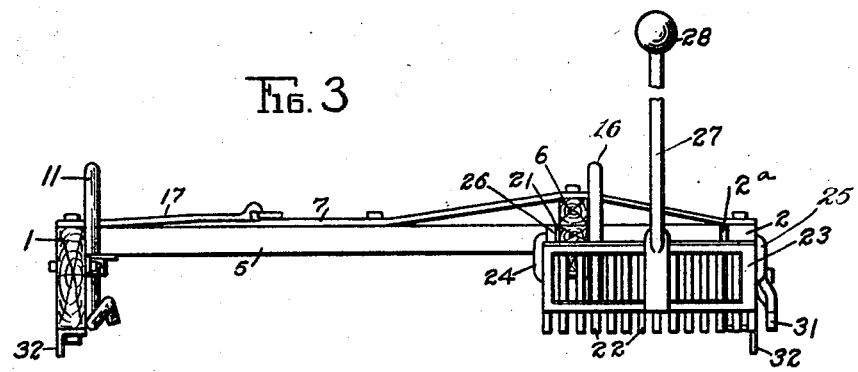
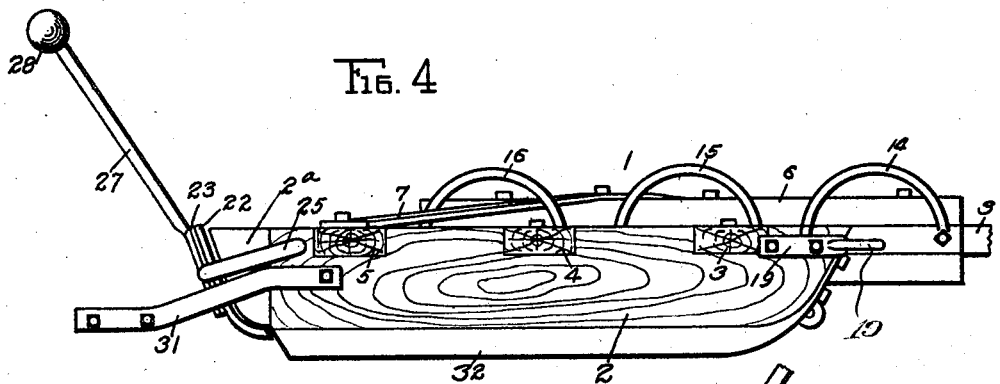
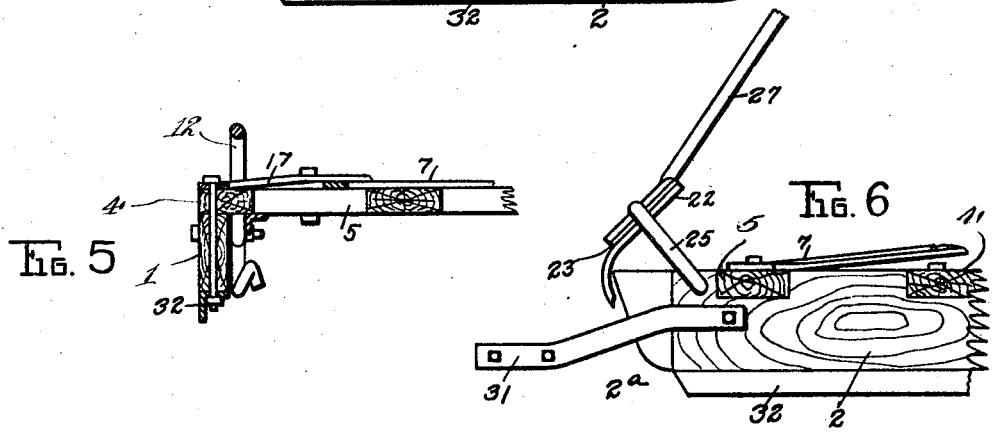

RUSSELL E. ZERKLE, OF NORTH HAMPTON, OHIO.

STONE-GATHERING MACHINE.

1,323,804.  Specification of Letters Patent.  Patented Dec. 2, 1919.

Application filed November 1, 1916. Serial No. 128,877.

*To all whom it may concern:*

Be it known that I, RUSSELL E. ZERKLE, a citizen of the United States, residing at North Hampton, in the county of Clark and State of Ohio, have invented certain new and useful Improvements in Stone-Gathering Machines, of which the following is a specification.

This invention relates to improvements in stone-gathering machines, it particularly relating to a machine designed for the purpose of gathering loose stones from roads, especially graveled roads or other roads of a stony character.

The object of the invention is to provide a device of the character referred to which will be simple in construction, economical in manufacture and effective for the work for which it is designed.

In the accompanying drawings:—

Figure 1 is a top plan view of a machine embodying my improvements, a portion of the parts at the rear end of the machine being broken away.

Fig. 2 is a view of those parts which have been broken away in Fig. 1.

Fig. 3 is an end view.

Fig. 4 is a side view.

Fig. 5 is a section on the line 5—5 of Fig. 1.

Fig. 6 is a side view of the rear portion of the machine showing the gate in tilted position.

Referring to the drawings, the main frame of the machine consists of two side runners 1 and 2 which are disposed parallel to the line of travel, angularly arranged cross-bars 3, 4 and 5 which connect the runners 1 and 2, and a longitudinally-extending bar 6 which is secured to the respective cross-bars all preferably constructed of wood; also an angularly arranged metallic brace 7 which is secured to the rear end of the runner 2 through the bar 5 and extends across and is connected with the cross-bar 4, and the longitudinal bar 6 and has its forward end secured to the runner 1 through the bar 3. It will be noticed that the bar 6 is placed comparatively close to the runner 2 so that the runner 1 will be well in advance of the same. This is for the purpose of causing the chains, 8, 9 and 10, which are attached to the respective bars 1 and 6, to extend across the machine in an angular direction. These chains are connected with the runner by a series of curved links 11, 12 and 13, pivotally connected with the runner and having the chains connected respectively to their free ends. The chains are connected to the bars 6 by similar series of curved links 14, 15 and 16, which are likewise pivotally connected with the bar 6 and have the chains connected to their free ends.

Connected to the runner 1 by pivoted link 17 is a drag chain 18, and connected to the runner 2 by a clevis 19 is a drag chain 20. These drag chains are connected together at their forward ends and are provided with suitable hitch devices by which a team may be hitched to the machine.

In operation, the machine is dragged over the road preferably up one side of the road and down the other. The chains 8, 9 and 10 drag along over the surface of the road and gather up all loose stones, the stones gradually finding their way beneath the bar 6, the lower edge of which is removed a suitable distance from the ground, and are deposited against the runner 2. At the rear end of the runner 2 and bar 6 there is provided a pocket, the runner 2 and attached wing $2^a$ forming one side thereof and the plate 21 the opposite side thereof, the plate 21 being bolted or otherwise secured to the bar 6. The rear end of this pocket is normally closed by a gate which consists of a series of forwardly curved teeth 22 secured to a rectangular frame 23, the frame having arms 24 and 25 on its respective sides one of which is pivotally connected to the runner 2 and the other one of which is pivotally connected to a bar 26 which is secured to and extends rearwardly from the bar 6. Also connected to the frame 23 is an upwardly extending arm 27, the extreme upper end of which is provided with a weight 28 which assists in holding the gate in closed position, in which position the forward ends of the teeth 22 will lie in close proximity to the ground line. When the pocket has become sufficiently filled with stones, the gate will be opened to the position shown in Fig. 6 and as the machine moves forwardly the stones will be left deposited in a pile at the side of the road.

By reason of the fact that the chains 8, 9 and 10 are pivotally supported by the links referred to, the chains will be allowed to drop into any depressions in the road or to ride over ridges or any other obstructions. The chains described are effective for gathering up all loose stones excepting a few of the very small ones. In order that these small stones may also be gathered, I have provided additional chains 29 and 30 one end of each of which is secured to the rear chain 10 and the other end of which is secured to the rearwardly extending bar 31, the forward end of which is pivotally connected to the runner 2. These chains are considerably smaller than the chains 8, 9 and 10 and act effectively to gather the smaller stones. These chains 29 and 30 it will be noted also extend at an angle to the line of travel, so that these smaller stones will be gathered and deposited at the side of the road.

Each of the runners preferably has its lower edge provided with an angle iron 32, with one edge turned downwardly so that it will enter the road bed and prevent the machine from skidding.

Having thus described my invention, I claim:—

1. In a machine of the character described, a main frame comprising a pair of runners arranged parallel to the line of travel, an angularly arranged flexible device supported entirely by said frame and arranged to be dragged over the ground as said frame is moved forward, said frame having a pocket at the rear or discharge end of said flexible device, the outer side of said pocket being formed by one of said runners, and a pivoted gate at the rear end of said pocket, said gate comprising curved teeth whose free ends are in close proximity to the ground.

2. In a machine of the character described, a main frame comprising a pair of runners arranged parallel to the line of travel, an angularly arranged flexible device supported entirely by said frame and arranged to be dragged over the ground as said frame moves forwardly, said frame having a pocket at the rear or discharge end of said flexible device the outer side of which is formed by one of said runners, and a pivoted gate at the rear end of said pocket, said gate comprising curved teeth whose free ends are in close proximity to the ground, and a weighted arm for holding said gate in closed position.

3. In a machine of the character described, a frame comprising a pair of runners arranged parallel to the line of travel, cross-bars connecting said runners, a longitudinal bar connected with said cross-bars, and a series of angularly arranged flexible chains connected with one of said runners and with said longitudinal bar, said frame having a pocket arranged at the discharge or rear end of said chains.

4. In a machine of the character described, a pair of runners one arranged in advance of the other, angularly arranged cross-bars connected with said runners, a longitudinal bar connected with said cross-bars and lying in parallel relation to said runners and in comparatively close proximity to the rear runner, said longitudinal bar being supported by said cross-bars so as to leave a space beneath the same, a series of chains connected with the advance runner and with said longitudinal bar, the point of connection of each chain with said longitudinal bar being in the rear of the point of connection with said runner, and a pocketed device pivotally connected with the rear runner and said longitudinal bar.

In testimony whereof I have hereunto set my hand this 28th day of October, 1916.

RUSSELL E. ZERKLE.

Witness:
CHAS. I. WELCH.